United States Patent [19]
Laajala

[11] 3,844,433
[45] Oct. 29, 1974

[54] DEVICE FOR TRANSPORTING TURKEY FEED TO A TURKEY FEEDER

[76] Inventor: Gene W. Laajala, McGregor, Minn. 55760

[22] Filed: Nov. 10, 1972

[21] Appl. No.: 305,468

[52] U.S. Cl............... 214/522, 222/533, 214/83.32, 214/83.26
[51] Int. Cl.............................................. B60p 1/42
[58] Field of Search........... 214/519, 520, 521, 522, 214/83.26, 83.32, 42 R, 42 A

[56] References Cited
UNITED STATES PATENTS

| | | | |
|---|---|---|---|
| 2,139,417 | 12/1938 | Milan | 214/522 |
| 2,417,020 | 3/1947 | Shugart | 214/522 |
| 2,839,208 | 6/1958 | Hansen | 214/522 |
| 3,409,155 | 11/1968 | Hamlet | 214/519 |
| 3,561,681 | 2/1971 | Tyler | 214/519 X |

*Primary Examiner*—Albert J. Makay
*Attorney, Agent, or Firm*—Wicks & Nemer

[57] ABSTRACT

A device for transporting turkey feed to a turkey feeder and filling the same including in combination a wheeled mobile chassis, means carried by the chassis for propelling the same, a receiver for feed carried by the chassis, a conveying member connected to and communicating with said receiver, means for conveying feed in said receiver to said conveying member, means carried by said chassis for operating said propelling means, means for controlling the direction of the propelled chassis, and a seat on said chassis directly adjacent said conveying member, and adjacent said means for operating said propelling means and said direction controlling means.

1 Claim, 3 Drawing Figures

DEVICE FOR TRANSPORTING TURKEY FEED TO A TURKEY FEEDER

SUMMARY

The invention relates to a mobile device for transporting turkey feed to a turkey feeder and filling the feeder. In the process of raising turkeys the same may be fed in the field where feeders are placed. With present known methods of filling the feeders a separate device for carrying the feed and dispensing it into a feeder is drawn by a tractor. In filling the feeders the operator of the tractor must dismount the tractor and operate the dispensing means of the device drawn by the tractor and then remount the tractor. The present invention provides a single unit for carrying feed and dispensing it into a turkey feeder without the operator moving off the unit.

Other and further objects and advantages will become apparent from the disclosure in the following specification and accompanying drawings.

In the drawings forming part of this application:

Figure 1:
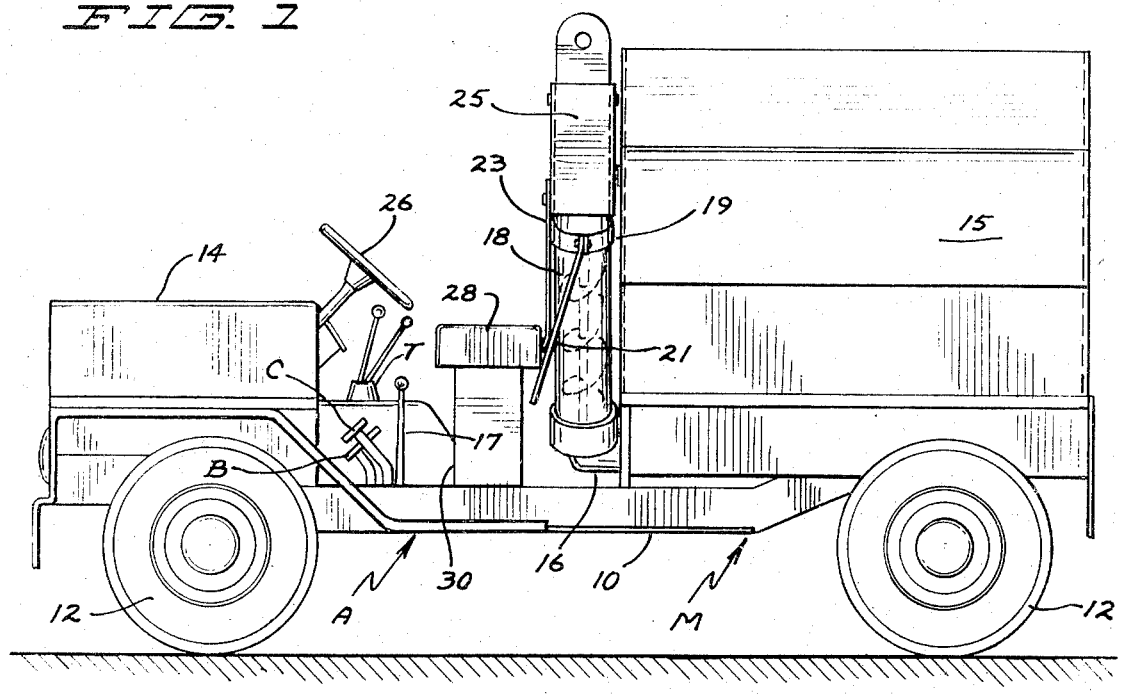
FIG. 1 is a side elevational view of a mobile device for transporting turkey feed and filling turkey feeders embodying the invention.
Figure 2:
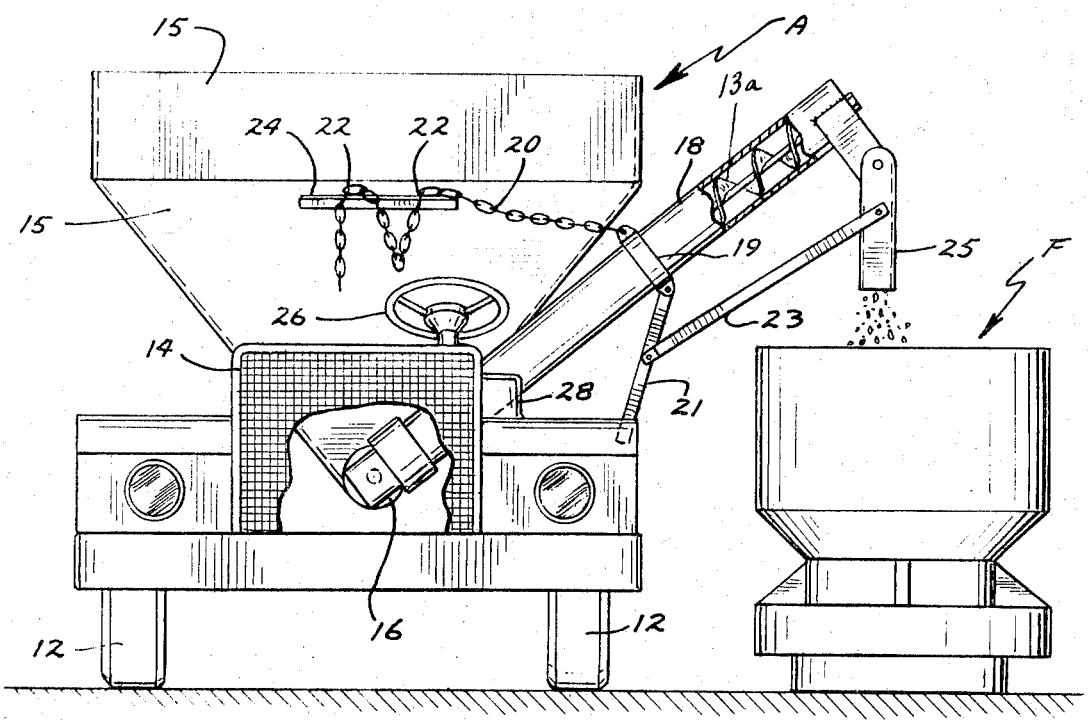
FIG. 2 is a front end view thereof a portion of which is broken away with the elevator member in loading position over a turkey feeder.
Figure 3:
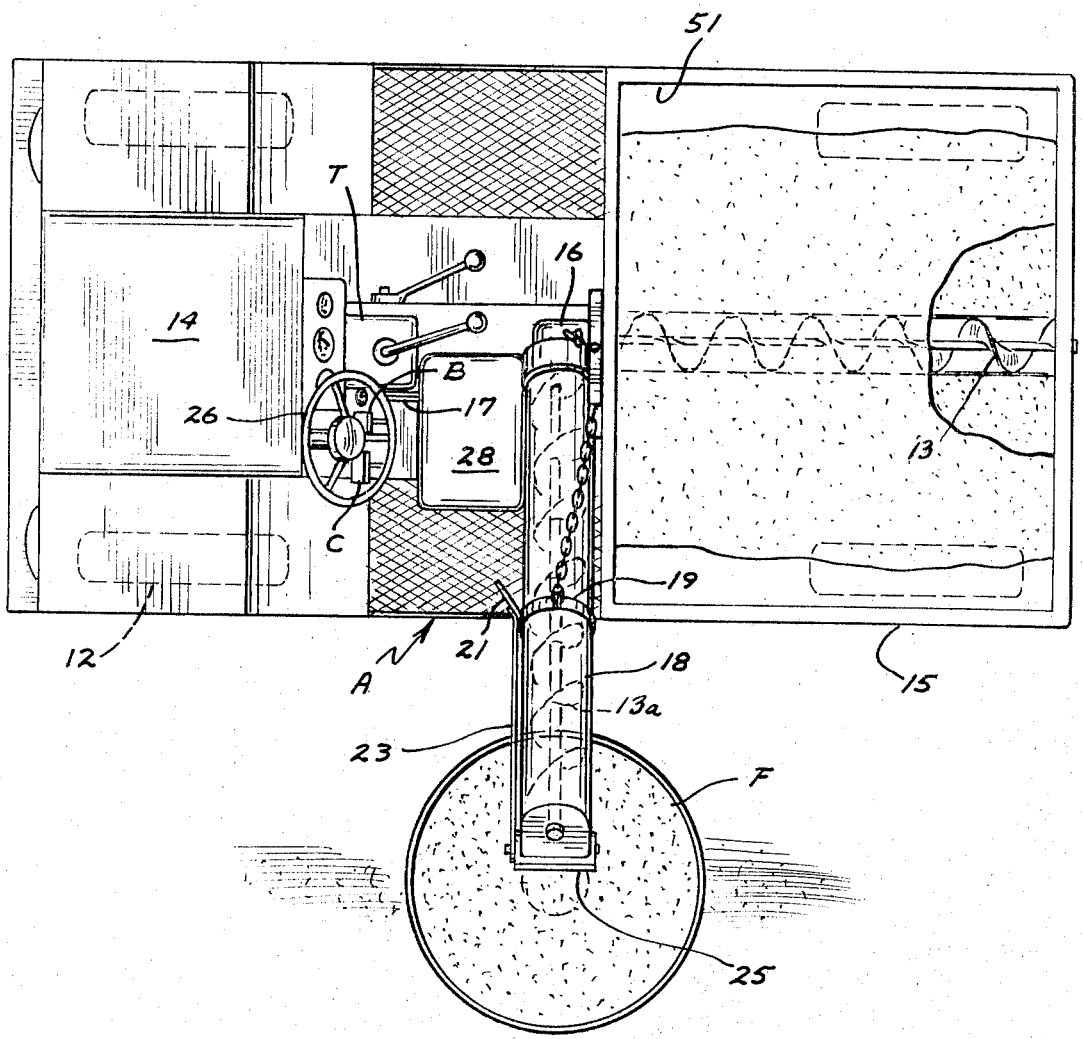
FIG. 3 is a top plan view thereof.

Referring to the drawings in detail the mobile device for transporting turkey feed and filling turkey feeders A which embodies the invention includes the mobile unit M. The unit M includes the chassis frame 10 which has the wheels 12 mounted on conventional axles, not shown, one or both of which are conventionally driven. Mounted on the front of the chassis frame 10 is a conventional engine not shown, under the hood 14, the engine driving the wheels by means of conventional drive units.

Secured to the rear of the frame 10 is a receiver in the form of a hopper 15 with an outlet 16 at the front lower end thereof. A means for conveying feed from the receiver is found in a first conventional auger 13 mounted longitudinally in the bottom of the hopper which cooperates with a second conventional auger 13a in the tubular elevator conveying member 18 pivotally connected at its lower end to the forward bottom of the hopper. The elevator is also rotatable about its longitudinal axis at the lower end. The augers are rotated by conventional means controlled by the lever 17. The elevator conveying member 18 is held in various pivotal positions by means of the chain 20 secured at one end to the elevator 18 with the other end of the chain engageable in slots 22 in the anchor angle member 24 secured to the hopper. Mounted on the elevator 18 is the band 19, and pivotally connected to the band is the handle 21. Further provided is the link 23 pivotally connected at one end to the handle 21 and at the other end to the spout 25. The device A is steered by the wheel 26 having conventional control mechanisms for the front wheels 12.

The numeral 28 designates a seat which is mounted on the support 30 upon the chassis frame 10 directly behind the steering wheel 26 and just forward of and adjacent the lower end of elevator conveying member 18. The device A is further controlled by the conventional transmission T in part operated by the clutch pedal C located adjacent the seat 28 and the steering wheel 26.

The operation of the device is as follows. The hopper 15 is loaded with turkey feed. The operator mounts the seat 28 and operates the mobile unit to a point in the field where the feed is to be deposited. Without leaving the seat 28 the operator moves the elevator 18 into unloading position over the feeder F positioned in the field.

By means of the handle 21 the elevator 18 may be rotated by the operator in the seat and by pivoting the handle 21 the spout 25 may be pivoted through the link 23 whereby the spout may be adjusted and aligned for delivery of feed into a feeder such as F. The augers of the hopper and elevator are operated and feed is thereby conveyed from the hopper 15 to the feeder F without the operator leaving the seat. The elevator is raised to an upward position without the operator leaving the seat 28 and the unit driven to a further feeder such as F where the procedure is repeated. Thus, with the device described herein a number of feeders may be filled without the operator leaving the seat on the device which greatly reduces the time for such filling as with a hopper drawn behind a tractor where the operator has to dismount the tractor each time to align the elevator with the feeder and then remount the tractor. Also the single unit M does the complete job of filling a feeder.

I claim:

1. A device for transporting turkey feed to a turkey feeder and filling the same comprising in combination:

a. a wheeled mobile chassis having an
   b. open seat,
   c. means carried by said chassis for propelling the same,
   d. a receiver for feed carried by the chassis,
   e. a conveying member connected to and communicating with said receiver,
   f. means for conveying feed in said receiver to said conveying member,
   g. means carried by said chassis for operating said propelling means
   h. means for controlling the direction of the chassis,
   i. said open seat positioned on said chassis directly adjacent said conveying member and adjacent said means for operating said propelling means and said direction controlling means,
   j. said conveying member includes a spout pivotably connected thereto, and
   k. means for pivoting said spout by an operator seated on said seat.

* * * * *